United States Patent Office 3,319,564
Patented May 16, 1967

3,319,564
METHOD FOR PREPARING PLASTIC-BACKED ELECTROTYPES
Daniel Louis Goffredo, 104 Main St., Riverton, N.J. 08077
No Drawing. Filed May 20, 1963, Ser. No. 281,749
2 Claims. (Cl. 101—401.1)

This invention relates to a new composition and method for backing electrotype shells with plastic to produce flexible electrotype printing plates of improved printing quality and simplicity of manufacture.

The present method of backing electrotype shells is to lay the shells face down on a level table, surround the shell with a dam, pour molten lead (electrotype alloy) onto the back of the shell, and allow the lead to cool and solidify. The shell had previously been cleaned and tinned so that the lead would adhere to it. The lead back is then planed to achieve a set overall thickness of electrotype shell and lead back-up. This combination of electrotype shell and lead backing shall now be referred to as an electrotype printing plate. Up to this point the present process is simple and straight forward. However, the following steps are the drawback to the present process.

The electrotype printing plate is now checked for printing surface level and it is found that certain image areas will not print because they are below the general plate level. The corresponding back portions of these areas are pounded down, causing the lead to flow and push against the electrotype shell, to raise these low areas to the general plate level. This is a slow and tedious process requiring skilled artisans. It becomes even more tedious to produce the curved electrotype plates required by modern rotary presses. These lead backed electrotype plates are heavy and cumbersome and, also, are easily damaged.

There have been attempts to substitute rigid and hard plastics for the lead backing so that lightweight electrotype plates could be made. These rigid and hard plastics were unsuccessful primarily because they could not be corrected for surface level.

The necessity for correcting surface level stems from the inherent warp in the electrotype shell. This warp can be pounded out of a lead-backed electrotype shell because the lead is forced to cold flow by pounding on the back of the plate. This correcting method does not work with rigid plastic backed shells. The differential in the thermal coefficient of expansion between the electrotype shell and the back, also, cause warpage. The rigid plastic substitutes were laminated against the electrotype shell by means of heat and pressure. When the heat and pressure were relieved, the plate would warp. Attempts were made to compensate for the differential in thermal coefficient of expansion between the plastic and the electrotype shell by adding fillers. These attempts have been unsuccessful.

The electrotypes industry has been sorely looking for a light-weight and curved electrotype plate to meet the requirements of the modern printing industry and rigid plastic back-ups have failed to satisfy this need.

It is the principal object of this invention to provide a plastic composition and method for making plastic backed electrotype plates of exceptionally uniform level while printing. A further object of this invention is to provide lightweight flexible plastic backed electrotype plate that can easily be curved for rotary printing. A further object of this invention is to provide plastic backed electrotype plates of exceptional printing quality.

This invention is directed to an electrotype backing composition and method based upon liquid casting plastics that cure to a flexible and soft condition. The liquid casting plastics have a low surface tension and readily conforms to the irregularities on the back of the electrotype shell thereby readily filling in the voids and producing a level plastic backing. The cured palstic is not hard but fluid-like in nature, i.e. so that it can transfer pressure in a somewhat hydraulic manner but still not flow. The flexible plastic properties considered for the ideal embodiment of this invention are opposite in physical characteristics to the rigid plastic systems considered by other inventions in the past. I have found that the more flexible the cured plastic, the more adaptable it is for electrotype backing. The cured plastic can even be gel like, gummy, or dilatant in nature. The preferred plastic comprises epoxy compositions because of its great bonding strength to metals and because of its versatility in compounding into flexible systems and, also, because of its low linear shrinkage.

The epoxy is compounded into a liquid or putty-like composition with its curing agent, plasticizer and/or filler. Other flexible curing plastics such as the polyesters, polyurethane and vinyls are, also, suitable. Magnetic fillers such as iron alloys or compounds, may be added for the convenience of using magnetic force to hold the plate. The plastic may be foamed to further reduce weight and cost.

The preferred method of my invention is to lay the electrotype shell face down onto a level table, such as a vacuum table and pour the liquid plastic over the shell. The liquid plastic is contained within the shell by means of a barrier. The shell may be heated to accelerate the curing of the plastic. The plastic backed shell is then ground to a finish thickness and is then readily fitted to a curved cylinder for rotary printing. This method can be varied by precasting the plastic in sheet form, or using preformed sheets such as vinyls, and then laminating this preformed sheet against the shell by means of some additional liquid plastic. This variation has the advantage of allowing pressure to be exerted against the preformed plastic to flatten out the shell.

Another variation is to laminate a sheet of metal, by means of the liquid plastic, to the shell. This allows the making of rigid plate with flexible characteristics because of the cushion of flexible plastic between the shell and the metal sheet.

Another variation of my invention, is to etch the non-image areas away from the electrotype shell. This is accomplished after laminating the flexible plastic to the electrotype shell. The image area is covered with an acid resistant coating to protect it from the etchant. The face of the plate is then impinged with an etchant, such as 42 Bé. ferric chloride solution until the non-image areas of the electrotype shell are etched through, exposing the plastic beneath. This removal of metal from the non-image areas produces a printing plate of increased flexibility and further improved printing quality. The electrotype shell may, also, be removed by electrolytic etching.

My invention is based upon the discovery that when the plastic-back is soft and flexible it is not highly critical whether the printing surface is all at the same level in the curved plate. It is only important that the plate is of uniform thickness, therefore slight warpage can be tolerated because printing impressions will push against the high spots and keep them within printing level.

The following examples will more specifically describe my invention.

*Example 1*

|  | Parts by weight |
|---|---|
| Epoxy resin | 90 |
| Polysulfide | 80 |
| Triethylene tetramine | 10 |

An electrotype shell was held face down on a vacuum table and surrounded with a dam. The above mixture was poured over the shell to a depth of about seventy-five thousandths of an inch. The plate was heated to 180° F. for 20 minutes. The cured plate was ground to the required finish thickness of sixty-five thousandths of an inch. The face of the electrotype was routed through the metal shell and into the plastic in order to get more space depth in the finished plate. The plate was trimmed to size. The plate was found to be easily flexed. The plastic backed plate was of uniform thickness but was found to have a slight warp. This plate was set on a flat bed press and was found to give a perfect printing impression in spite of the slight warp because the plate flexed on each printing impression.

Example 2

| | Parts by weight |
|---|---|
| Flexible curing polyester resin | 99 |
| Methyl ethyl ketone peroxide | 2 |
| Cobalt naphthenate (6%) | 0.5 |

The above mixture was used to cast a slab of plastic one hundred thousandths of an inch in thickness. This plastic slab cured at room temperature within five minutes.

An electrotype shell was laid face down on a level table and given a coating of the above liquid mixture. The previously formed plastic slab was laid over the electrotype shell and some weight was placed over the plastic slab to hold everything flat. This system cured within a few minutes at room temperature.

The weights were lifted off the plastic-backed electrotype shell. The plastic-backed shell was ground to a uniform thickness of one hundred and twenty thousandths of an inch and it was found sufficiently flexible to curve for rotary printing.

Example 3

| | Parts by weight |
|---|---|
| Liquid urethane elastomer | 100 |
| 4,4'-methylene-bis-(2-chloroaniline) | 29 |

An electrotype shell was held flat on a vacuum table and the above mixture was poured over the plate and confined within the plate area. A sheet of metal with a similar thermal coefficient of expansion as the electrotype shell was placed over the plastic at an exact height so that the overall thickness was sixty-five thousandths of an inch. The system was heated to 200° F. for a half hour.

The finished plate was found to be of uniform thickness, not warped, and to be semi-rigid in characteristics yet curvable.

Example 4

| | Parts by weight |
|---|---|
| Dispersion grade vinyl resin | 50 |
| Epoxidized soy bean oil | 4 |
| Butyl benzylphthalate | 25 |
| 2-ethyl-hexylphthalate | 21 |

An electrotype shell was held flat on a vacuum table and the above mixture was made into a foam by means of entrapping gas into the plastic. The plastic was troweled over the shell and heated to 350° F. for fifteen minutes.

The plate was then ground to a uniform thickness but was slightly warped. It was found to be easily curved and gave a good printing impression because of its flexibility.

Example 5

An electrotype shell was placed face down on a flat table and given a brush coating of the composition cited in Example 1, to which was added some silica flour to make the coating more viscous. The coating was of sufficient thickness to more than fill in all voids on the back of the electrotype shell. A 0.030" thick piece of vinyl sheet was laid over the epoxy coating. A heavy weight was placed over the vinyl sheet to hold it flat and, also, to press the electrotype shell flat. Heat was applied for 30 minutes at 150° F.

After curing the face of the electrotype shell was "rolled-up" with an acid resistant ink so that the image areas were covered. The electrotype plate was placed in an etching machine and etched with 42 degree Baume ferric chloride solution until all the larger non-printing areas were etched through and exposed the flexible epoxy coating underneath.

This electrotype printing plate was found to readily lie flat and was, also, found to be flexible and to be a good rotary printing plate.

The above examples serve to describe my invention. Although I specifically cite examples of epoxy, polyester, polyurethane and vinyl plastics it becomes obvious that other plastics can be used, provided that they cure to a flexible and soft state and are capable of transmitting pressure in a hydraulic like manner in order to compensate for slight warpage.

I claim as my invention:

1. The method of producing a flexible printing plate from an electrotype shell which comprises the following steps: (1) placing the electrotype shell face down on a flat surface, (2) holding the electrotype shell against the flat surface, (3) surrounding the electrotype shell with a barrier, (4) applying to the back of the electrotype shell a liquid plastic composition that cures to a soft state, (5) causing the plastic composition to cure, (6) coating the printing surface with an acid-resistant coating, and (7) etching through the non-printing areas of the electrotype shell and thereby exposing the soft plastic beneath.

2. The method of producing a flexible printing plate from an electrotype shell which comprises the following steps: (1) placing the electrotype shell on a flat surface, (2) applying to the back of the electrotype shell a liquid plastic composition that cures to a soft state, (3) placing a preformed flexible sheet over the liquid plastic, (4) applying pressure to the preformed flexible sheet so as to hold the surface of the electrotype shell against the flat surface, (5) causing the liquid plastic composition to cure, (6) coating the printing surface with an acid resistant coating, and (7) etching through the non-printing areas of the electrotype shell and thereby exposing the soft plastic beneath.

References Cited by the Examiner

UNITED STATES PATENTS

| | | | |
|---|---|---|---|
| 2,383,080 | 8/1945 | Reilly et al. | 101—401.2 |
| 2,564,659 | 8/1951 | Lomax | 156—14 |
| 2,942,544 | 6/1960 | Williams | 101—382 |
| 2,982,207 | 5/1961 | Stromme | 101—395 |
| 3,029,730 | 4/1962 | Parrish et al. | 101—395 |
| 3,101,668 | 8/1963 | Leeds | 101—401.1 |
| 3,124,068 | 3/1964 | Thomas | 101—401.1 |
| 3,145,654 | 8/1964 | Johnson et al. | 101—401.1 |

OTHER REFERENCES

Modern Plastics, vol. 36, No. 6, February 1959, pp. 94, 95 relied on.

DAVID KLEIN, *Primary Examiner.*

H. J. STRNISHA, *Assistant Examiner.*